United States Patent [19]

Taig et al.

[11] Patent Number: 4,582,184

[45] Date of Patent: Apr. 15, 1986

[54] BRAKE CONTROL DEVICE

[75] Inventors: Alistair G. Taig, South Bend; Thomas G. Lankford, New Carlisle; James K. Roberts, deceased, late of South Bend, all of Ind., by Doris Roberts, executrix

[73] Assignee: Allied Corporation, Morristown, N.J.

[21] Appl. No.: 596,178

[22] Filed: Apr. 2, 1984

[51] Int. Cl.⁴ .............................................. B60K 41/24
[52] U.S. Cl. ................................ 192/13 A; 192/3 H
[58] Field of Search .............. 192/3 H, 13 A, 30 V, 192/44; 188/353; 303/98; 74/470, 477, 490; 403/11, 397

[56] References Cited

U.S. PATENT DOCUMENTS

| | | | |
|---|---|---|---|
| 1,909,859 | 5/1933 | Gunderman | 192/13 A |
| 2,028,491 | 1/1936 | Barrett et al. | 192/3 H |
| 2,036,700 | 4/1936 | Johnson | 192/13 A |
| 2,048,501 | 7/1936 | Goosman | 192/30 V |
| 2,131,944 | 10/1938 | Freeman | 192/13 A |
| 2,160,126 | 5/1939 | Coffman | 192/13 A |
| 2,167,501 | 7/1939 | Freeman et al. | 192/13 A |
| 2,228,244 | 1/1941 | Baker | 188/67 |
| 2,251,787 | 8/1941 | Gardiner | 192/13 A |
| 2,284,189 | 5/1942 | Dick | 192/3 H |
| 2,499,993 | 3/1950 | Gregg | 188/67 |
| 2,722,847 | 11/1955 | Petrochko | 74/478.5 |
| 3,659,329 | 5/1972 | Walker | 403/11 |
| 4,247,154 | 1/1981 | Shoji et al. | 303/24 A |
| 4,299,134 | 11/1981 | Roy et al. | 74/470 |
| 4,533,028 | 8/1985 | Taig | 192/13 A |
| 4,538,710 | 9/1985 | Taig | 192/13 A |

FOREIGN PATENT DOCUMENTS 1455631 5/1969 Fed. Rep. of Germany .

Primary Examiner—Rodney H. Bonck
Assistant Examiner—Richard M. Lorence
Attorney, Agent, or Firm—Larry J. Palguta; Ken C. Decker

[57] ABSTRACT

An improved brake control device includes a pair of covers releasably coupled together to enclose a housing opening. The pair of covers also cooperate to movably support a connecting member and retain a cam shaft in the housing. The brake control device cooperates with a brake pedal and a clutch pedal to hold a vehicle on an incline upon termination of a brake application when the clutch pedal is depressed and the vehicle is forwardly disposed on an incline.

11 Claims, 5 Drawing Figures

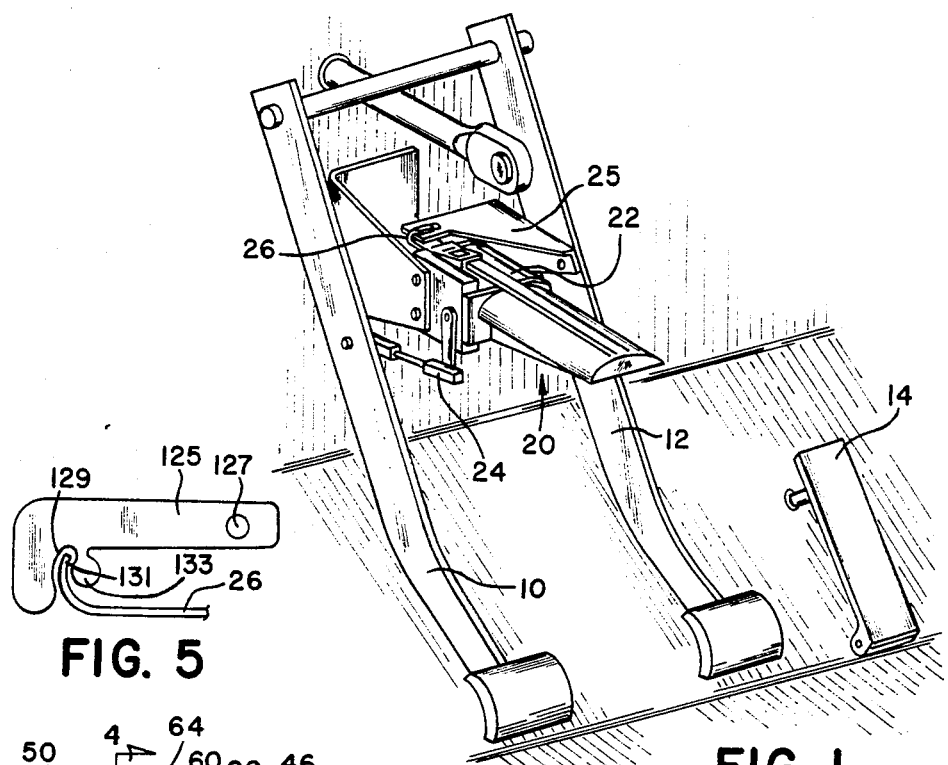
FIG. 5
FIG. 1
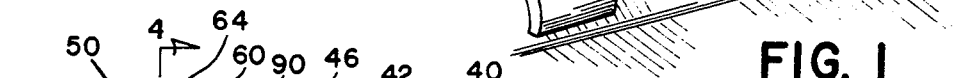
FIG. 2
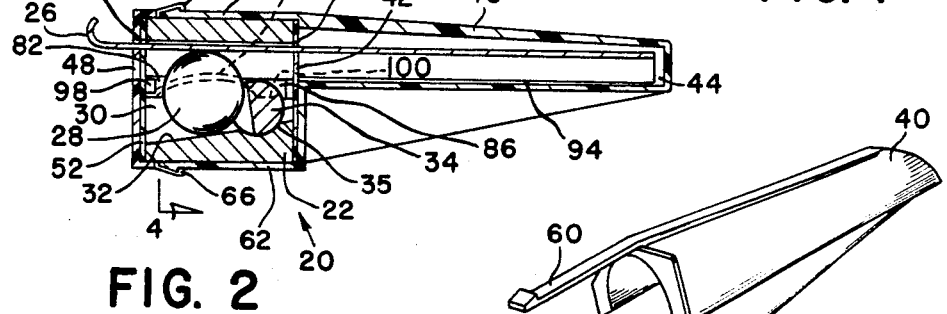
FIG. 3
FIG. 4

BRAKE CONTROL DEVICE

The present invention relates to an improved brake control device wherein a vehicle with a clutch pedal and a brake pedal includes a locking device to retain the brake pedal in an applied position when the clutch pedal is depressed and the vehicle is disposed on an incline and also when the vehicle operator removes his foot from the brake pedal.

Heretofore, in U.S. patent application Ser. Nos. 4,533,028 and 4,538,710, a brake control device has been disclosed which automatically prevents a vehicle from rolling backwards down an incline when the clutch pedal is depressed and the vehicle operator's foot has been moved after a brake application to an accelerator pedal. Thereafter, when the clutch pedal is released, the brake control device simultaneously releases the brake pedal so that the vehicle is free to continue movement up the incline. The brake control device included a connecting member which moved with the brake pedal during each brake application. Consequently, it is desireable to carry the connecting member in such a manner permitting effortless movement while also reducing noise or chatter associated with movement of the connecting member.

The present invention comprises an improved brake control device wherein a vehicle includes a brake pedal and a clutch pedal, the brake control device comprising a housing fixedly disposed relative to the vehicle and defining an opening therein, a connecting member carried within the opening and operatively coupled to the brake pedal, a linkage assembly extending into the opening and operatively coupled to the clutch pedal and locking means carried within the opening to automatically lock the connecting member to the housing when the clutch pedal is depressed and the vehicle is disposed on an incline, characterized in that said housing includes at least one cover closing one end of the opening and said one cover includes a pair of integral and flexible fingers extending into the opening to resiliently support said connecting member for movement in the opening.

It is an advantage of the present invention that the one cover resiliently supports the connecting member substantially over the length of the housing opening, while at the same time the one cover retains a part of the linkage assembly in the housing opening.

In the drawings,

FIG. 1 is a perspective view of the arrangement for a clutch pedal, brake pedal and accelerator in a vehicle which is equipped with the improved brake control device.

FIG. 2 is a cross-sectional view of the improved brake control device.

FIG. 3 is an exploded perspective view of the pair of covers.

FIG. 4 is a cross-sectional view taken along line 4—4 of FIG. 2.

FIG. 5 is an alternative embodiment for connecting the control device with the brake pedal.

A vehicle equipped with a standard transmission includes a clutch pedal 10 operable to disengage the transmission from the motor to permit shifting of gears in the transmission. A brake pedal 12 is operable to control actuation of the vehicle brake system, and an accelerator pedal 14 controls the vehicle engine speed. If the vehicle is stopped on an incline, the vehicle operator will normally position one foot on the clutch pedal to disengage the transmission and the other foot on the brake pedal to hold the vehicle stationary on the incline. When it is time to continue up the incline, the foot on the brake pedal must be moved to the accelerator to increase the engine speed at the same time the clutch pedal is returned to its rest position. This procedure is awkward at times because the vehicle immediately moves backward once the foot on the brake pedal is separated therefrom to release the brake system. In order to overcome this predicament, a brake control device 20 is mounted on the vehicle between the brake pedal 12 and the clutch pedal 10. The brake control device includes a housing 22 fixed relative to the vehicle, a linkage assembly 24 coupled to the clutch pedal 10 and a connecting member 26 coupled to the brake pedal via a bracket 25, the connecting member 26 forming first means for connecting operatively with the brake pedal. As shown in FIG. 2, there is also a ball 28 movably disposed within the housing in an opening 30 extending therethrough. The surface 32 forming the opening is slanted so that when the vehicle is on a flat level surface, the ball 28 will remain at one end of the opening spaced from the connecting member 26. Conversely, when the vehicle is disposed on an incline in a forward direction, the ball 28 is free to move on the surface into a wedge fit with the connecting member 26 and the housing 22, the ball 28 forming third means for selectively locking member 26 to the housing. In order to control operation of the ball 28, the linkage assembly 24 includes a cam shaft 34 extending into the opening 30 via bore 35 to oppose the ball 28, the cam shaft 34 forming second means for connecting operatively with the clutch pedal. Since the linkage assembly is coupled to the clutch pedal 10, the cam shaft 34 is movable in response to movement of the clutch pedal from a first position preventing engagement with both the connecting member 26 and the housing 22 to a second position permitting engagement therebetween. The cam shaft 34 permits engagement for the wedge fit between the ball 28 and the connecting member 26 when the clutch pedal is depressed and prevents engagement for the wedge fit when the clutch pedal is in its rest position. As a result, the vehicle will be stopped on an incline by the brake control device only when the clutch pedal 10 is depressed.

The housing 22 includes a first cover 40 sealingly closing one end of the opening 30 via a gasket 42. The first cover 40 defines a fluid passage 44 receiving the connecting member 26 while the gasket 42 defines an arcuate opening 46 receiving the connecting member 26. The housing 22 includes a second cover 48 with an arcuate opening 50 through which the connecting member extends outwardly of the housing and a gasket 52 cooperates with the second cover and the connecting member 26 to enclose the opening 30. In order to couple the covers together, each cover forms a pair of arms 60, 62 for cover 40 and 64, 66 for cover 48, the arms forming a location for releasably coupling together the covers. Arm 60 cooperates with arm 64 to define a releasable latch permitting the arms 60, 64 to be snapped together for locking cover 40 to cover 48. Similarly, arm 62 cooperates with arm 66 to define a releasable latch permitting the arms 62, 66 to be snapped together for locking cover 40 to cover 48.

The opening surface 32 forms a frusto-conical portion 70 carrying the ball 28 and a pair flat angularly disposed surface portions 72 and 74 slidably engaging the connecting member 26. The opening surface 32 forms a pair of shoulders 76 and 78 adjoining the frusto-conical portion 70. The first cover 40 includes a pair of integral and flexible fingers 80 and 82 which extend in the opening 30. A first or rigid portion 84, 86 of the fingers 80, 82 is engageable with the shoulders 76, 78 to locate the fingers in the opening 30. A second or flexible portion 88, 90 of the fingers 80, 82 extends arcuately in a longitudinal direction on each side of ball 28, and longitudinally from one side of ball 28 facing cover 40 to another side of ball 28 facing cover 48, to slidably engage the connecting member at the edges 92, 94 thereof, see FIG. 4. Consequently, the fingers 80, 82 resiliently retain the connecting member 26 in a predetermined position for sliding engagement with the surface portions 72, 74 of housing 22.

The second cover 48 is provided with tabs 96, 98 extending into the opening 30 to engage shoulders 76, 78 and locate the second cover relative to the opening 30. In addition, the tabs 96, 98 provide a location that opposes and engages the fingers 80, 82 to prevent the fingers from flattening out against shoulders 76, 78 in response to the weight or movement of the connecting member 26, and thereby maintain the resiliency of the fingers.

The cam 34 is provided with a pair of annular slots 100 receiving first or rigid portions 84 and 86 of fingers 80 and 82, so that the fingers prevent the cam from separating from the housing 22 when the covers 40 and 48 are snapped together.

In FIG. 5 the bracket 125 is coupled to the brake pedal via a pin 127 at one end while the other end forms an arcuate slot 129 to slidably receive the arcuate end 131 of connecting member 26. The bracket 125 is robust in the direction of a brake release to prevent the bracket 125 from fracturing and releasing the brake pedal. The bracket is weak in a brake apply direction so that if the control device locks up it is easy to separate the tongue 133 from the bracket upon a brake application. Consequently, the connecting member never prevents movement of the brake pedal in a brake application direction.

We claim:

1. An improved brake control device wherein a vehicle includes a brake pedal and a clutch pedal, the brake control device comprising a housing fixedly disposed relative to the vehicle and defining an opening therein, a connecting member carried within the opening and operatively coupled to the brake pedal, a linkage assembly extending into the opening and operatively coupled to the clutch pedal, and locking means carried within the opening to automatically lock the connecting member to the housing when the clutch pedal is depressed and the vehicle is disposed on an incline, characterized in that said housing includes at least one cover closing one end of the opening and said one cover includes a pair of integral and flexible fingers extending into the opening to resiliently support said connecting member for movement in the opening.

2. The improved brake control device of claim 1 in which said housing includes a second cover closing another end of the opening and said covers are engageable to define a releasable latch preventing separation of said covers.

3. The improved brake control device of claim 1 in which said housing includes a second cover closing another end of the opening and said pair of integral and flexible fingers extend from said one cover to said second cover.

4. The improved brake control device of claim 3 in which said second cover includes a pair of tabs extending into the opening to locate said second cover relative to said housing and oppose said pair of integral and flexible fingers, respectively.

5. The improved brake control device of claim 1 in which said linkage assembly includes, a cam shaft extending into said housing opening and at least one of said pair of integral and flexible fingers cooperates with said cam shaft to oppose withdrawal thereof from said housing opening.

6. The improved brake control device of claim 5 in which said pair of integral and flexible fingers define a first portion of rigid construction, said housing opening defining a longitudinally extending shoulder engageable with said first portion to locate said one cover relative to said housing, a second portion of flexible construction extending arcuately from said first portion in a longitudinal direction, and said first portion cooperates with said cam shaft.

7. The improved brake control device of claim 1 in which said locking means comprises a ball movably disposed within said housing opening and said pair of integral and flexible fingers extend longitudinally in said housing opening from one side of said ball to another side of said ball while remaining in spaced relation to said ball even when said ball is moving.

8. The improved brake control device of claim 1 in which said connecting member comprises a longitudinally extending plate of arcuate construction in a transverse plane in order to form a pair of longitudinally extending edges within said housing opening and said pair of flexible and integral fingers slidably engage said pair of longitudinally extending edges.

9. The improved brake control device of claim 1 in which said connecting member defines an arcuate end and a bracket extends from the brake pedal to the connecting member arcuate end to slidably engage the latter.

10. The improved brake control device of claim 1 in which the connecting member is coupled to the brake pedal via a bracket which is easily fractured in a brake apply direction so that the brake pedal can not be stopped from movement in the brake apply direction by the connecting member.

11. An improved brake control device carried by a vehicle and cooperating with a vehicle brake pedal and a vehicle clutch pedal to retain the brake pedal in an applied position during a brake application when the vehicle is disposed on an incline and the clutch pedal is depressed, the device including a housing with first means for connecting operatively with the brake pedal, second means for connecting operatively with the clutch pedal, and third means for selectively locking the first means to the housing, characterized in that said housing further includes a pair of covers substantially enclosing said third means within said housing, said pair of covers being engageable with each other at a first location to releasably couple together and engageable with each other at a second location to resliently retain said first means in a predetermined position within said housing while also providing for sliding movement of said first means relative to at least one of said pair of covers.

* * * * *